M. W. ALLEN & W. T. CONN.
ELECTRODE FOR FLAMING ARC LAMPS.
APPLICATION FILED APR. 23, 1909.
982,407.
Patented Jan. 24, 1911.
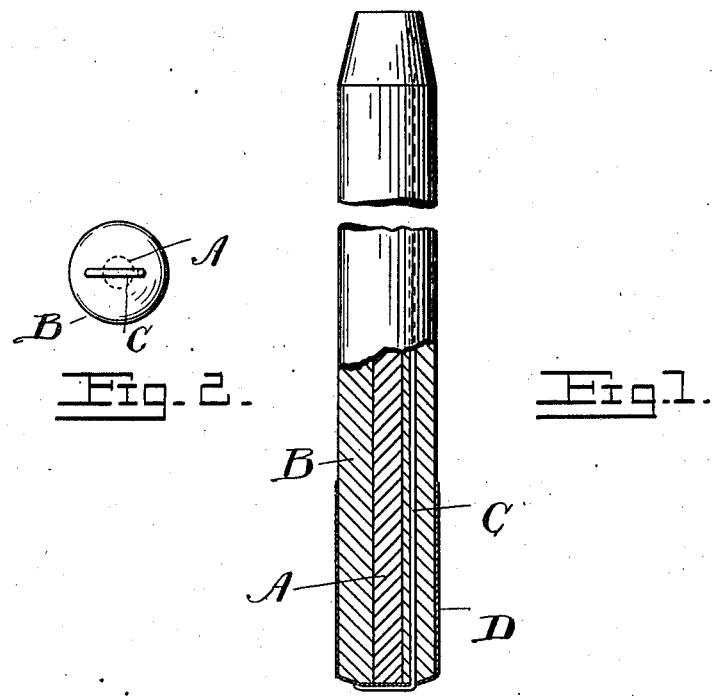
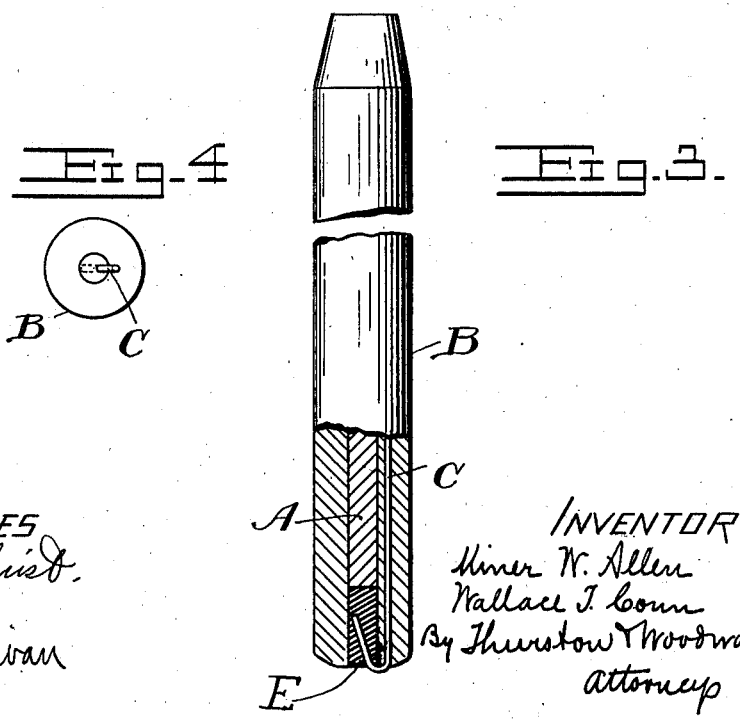

UNITED STATES PATENT OFFICE.

MINER W. ALLEN AND WALLACE T. CONN, OF LAKEWOOD, OHIO, ASSIGNORS TO NATIONAL CARBON COMPANY, OF CLEVELAND, OHIO, A CORPORATION OF NEW JERSEY.

ELECTRODE FOR FLAMING-ARC LAMPS.

982,407.   Specification of Letters Patent.   Patented Jan. 24, 1911.

Application filed April 23, 1909. Serial No. 491,784.

*To all whom it may concern:*

Be it known that we, MINER W. ALLEN and WALLACE T. CONN, both citizens of the United States, and both residing at Lakewood, in the county of Cuyahoga and State of Ohio, have invented certain new and useful Improvements in Electrodes for Flaming-Arc Lamps, of which the following is a full, clear, and exact description.

This invention relates to electrodes for flaming arc lamps, and particularly to electrodes which on account of their low conductivity, due largely to the fact that they have rather small cross sectional areas, are provided each with a metallic wire extending from end to end to decrease the resistance to the passage of current, such electrodes being commonly formed of a carbon shell and a central core, mainly of powdered carbon bound together by water glass and some color producing salt. In an electrode of this type, the wire is extended beyond the end of the same, and generally the end is flattened and bent over along the side of the electrode so that it may be engaged by the clamp which holds the electrode, the end of the wire being flattened in order that the clamp may grasp the electrode firmly and so that there will be fairly large surfaces of the clamp and flattened wire in contact.

The present invention relates particularly to the connection between the projecting end of the wire and the electrode proper, and has for its object to overcome a number of objectionable features of the constructions heretofore employed.

More particularly, the invention aims to attach the end of the wire to the electrode in a manner such that there will be a better electrical mechanical connection between the wire and the electrode, and to provide a connection which prevents the wire from being accidentally withdrawn from the electrode; which does away with any liability of the end of the wire being broken and the efficiency of the connection both mechanically and electrically destroyed, as is the case with prior constructions, and which does not prevent any part of the clamp engaging the surface of the electrode, as is the case when the end of the wire extends along the side of the electrode.

In an electrode embodying the present invention the wire which projects from the upper end of the electrode is not bent down against the side of the electrode, but is, however, connected with the electrode upon the upper end thereof by a metallic connection which makes a good electrical connection between the wire and electrode, and likewise makes a mechanical connection which prevents the wire from being withdrawn from the electrode either accidentally or otherwise.

In the drawing, Figure 1 is a side elevation partly sectioned of an electrode embodying the invention in its preferred form; Fig. 2 is an end view of the same; Fig. 3 is a side elevation partly sectioned of another embodiment of the invention; and Fig. 4 is an end view of the same.

Referring to the parts by letters, A represents the core and B the shell of the electrode; the core A being preferably formed of powdered carbon bound together by water glass and some other color producing salt, and the shell being formed of carbon as in the electrodes heretofore constructed, and C represents a wire passing through a hole in said electrode which extends from end to end, and the upper end of the wire projects from said hole.

In the construction shown in Figs. 1 and 2 the electrode has electro-plated upon its end, and, if desired, for a short distance down from the end, a coating D of copper. The projecting end $c$ of the wire is then bent over onto the end of the electrode and against this copper coating, and is mechanically connected therewith by either being soldered thereto or by some equivalent method, as, for example, by dipping the end of the electrode either into a bath of molten tin or molten zinc, or the like, or by electro-plating.

The construction shown in Fig. 3 is as follows: The core at the upper end of the electrode is removed for a short distance,—say one-half inch, more or less,—and then the end of the wire which projects from the upper end of the electrode is bent back upon itself, and its end inserted into the hole produced by so removing the core. Then the molten solder E or some other molten metal or alloy is poured into the hole around the wire, which, as in the former case, makes both a mechanical and an electrical connection between the projecting end of the wire and the electrode. In neither construction, however, does the wire extend over the end of the electrode and down against its side, wherefore said wire does not in any degree interfere with the proper gripping of the electrode by the clamp. The described connection of the wire with the electrode at the end thereof does, however, serve to hold the wire against accidental displacement. With either or any specific embodiment of the invention, it is unnecessary to flatten the wire, although it may be flattened if desired; and particularly it is unnecessary that the flattened wire should be bent down against the side of the electrode with danger of breaking it in so doing, and rendering it exceedingly likely that in handling the electrode this bent flattened end will be broken off.

It is thought that the best construction is that in which an external coating of metal is applied to the end and a short distance down the side of the electrode, and the projecting end of said wire is electrically connected with said coating. With this construction the clamp will grasp the coated end of the electrode, and thereby through it said clamp will have a good electrical connection with the wire.

Having described our invention, we claim:

1. An electrode for flaming arc lamps having a wire extended through said electrode from end to end and projected from the top thereof, said projecting end being connected both mechanically and electrically to said electrode.

2. An electrode for flaming arc lamps having a wire extended through said electrode from end to end and projected from the top thereof, said projecting end being bent down against the top of the electrode and embedded in metal intimately attached thereto and thereby connected to said top both mechanically and electrically.

3. An electrode for flaming arc lamps having a wire extended through said electrode from end to end and projected from the top thereof, said electrode having a metallic coating applied to its upper end, and the projecting end of said wire being mechanically and electrically connected with said coating.

4. An electrode for flaming arc lamps having a wire extended through said electrode from end to end and projected from the top thereof, said electrode having a metallic coating applied to its upper end and extended for a short distance along the cylindrical surface near said upper end, and the projecting end of said wire being mechanically and electrically connected with said metallic coating.

In testimony whereof, we hereunto affix our signatures in the presence of two witnesses.

MINER W. ALLEN.
WALLACE T. CONN.

Witnesses:
C. W. SANFORD,
GEO. M. SMITH.